(12) United States Patent
Chen et al.

(10) Patent No.: US 6,756,939 B2
(45) Date of Patent: *Jun. 29, 2004

(54) PHASED ARRAY ANTENNAS INCORPORATING VOLTAGE-TUNABLE PHASE SHIFTERS

(75) Inventors: Shuguang Chen, Ellicott City, MD (US); Daniel F. DiFonzo, Rockville, MD (US); Ernest P. Ekelman, Damascus, MD (US)

(73) Assignee: Paratek Microwave, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/361,272

(22) Filed: Feb. 10, 2003

(65) Prior Publication Data

US 2003/0151551 A1 Aug. 14, 2003

Related U.S. Application Data

(62) Division of application No. 09/621,183, filed on Jul. 21, 2000, now Pat. No. 6,538,603.

(51) Int. Cl.[7] .................................................. H01Q 3/26
(52) U.S. Cl. ........................................ 342/372; 342/375
(58) Field of Search ................................ 342/375, 372; 331/161; 343/700 MS

(56) References Cited

U.S. PATENT DOCUMENTS

| | | | |
|---|---|---|---|
| 4,458,218 A | | 7/1984 | Babbitt et al. |
| H173 H | | 12/1986 | Claborn et al. |
| 5,079,557 A | | 1/1992 | Hopwood et al. |
| 5,212,463 A | | 5/1993 | Babbitt et al. |
| 5,218,358 A | | 6/1993 | Harrington et al. |
| 5,307,033 A | | 4/1994 | Koscica et al. |
| 5,309,166 A | | 5/1994 | Collier et al. |
| 5,334,958 A | | 8/1994 | Rabbitt et al. |
| 5,451,567 A | | 9/1995 | Das |
| 5,479,139 A | * | 12/1995 | Koscica et al. ............... 333/18 |
| 5,557,286 A | | 9/1996 | Varadan et al. |
| 5,561,407 A | | 10/1996 | Koscica et al. |
| 5,589,845 A | | 12/1996 | Yandrofski et al. |
| 5,617,103 A | | 4/1997 | Koscica et al. |
| 5,680,141 A | * | 10/1997 | Didomenico et al. ....... 342/372 |
| 5,694,134 A | | 12/1997 | Barnes |
| 5,721,194 A | | 2/1998 | Yandrofski et al. |

(List continued on next page.)

OTHER PUBLICATIONS

Teo, Peng Thian, et al, "Adaptive Ferroelectric Phased Shifters For Phased Array Antenna," IEEE, 1999. pp. 182–188.*

Miranda, F. A. et al, "Tunable Microwave Components for Ku– and K–Band Satellite Communications," NASA/TM–1998–20693, May 1998, pp. 1–10.*

De Flaviis, Franco et al, "Planar Microwave Integrated Phase Shifter Design with High Purity Ferroelectric Material," IEEE Tran on Microwave Theory and Techniques, vol. 45, No. 6, Jun. 1997, pp. 963–969.*

Primary Examiner—Gregory C. Issing
(74) Attorney, Agent, or Firm—Robert P. Lenart; James S. Finn

(57) ABSTRACT

This invention provides a phased array antenna comprising an input, a feed network electronically coupled to the input, a plurality of radiating elements, a plurality of continuously voltage tunable phase shifters for receiving signals from the feed network and providing phase shifts for the signals prior to transmitting the signals to the radiating elements, and a controller for controlling the phase shift provided by the phase shifters. The phased array antennas can be configured to produce beams that can be scanned in one dimension (one-dimensional) or two dimensions (two-dimensional) by using continuously adjustable phase shifters that are based on low cost, low loss voltage-tunable dielectric materials.

20 Claims, 10 Drawing Sheets

U.S. PATENT DOCUMENTS

| | | |
|---|---|---|
| 5,917,455 A | 6/1999 | Huynh et al. |
| 5,936,484 A | 8/1999 | Dolfi et al. |
| 5,940,030 A | 8/1999 | Hampel et al. |
| 6,014,575 A * | 1/2000 | Miura ................. 505/210 |
| 6,016,123 A | 1/2000 | Barton et al. |
| 6,043,791 A | 3/2000 | Kinsey |
| 6,081,235 A * | 6/2000 | Romanofsky et al. ............ 343/700 MS |
| 6,496,147 B1 * | 12/2002 | Kirino ............ 343/700 MS |
| 6,538,603 B1 * | 3/2003 | Chen et al. ............ 342/372 |
| 2002/0014932 A1 * | 2/2002 | Osadchy et al. ............ 333/161 |

* cited by examiner

PHASED ARRAY ANTENNAS INCORPORATING VOLTAGE-TUNABLE PHASE SHIFTERS

CROSS REFERENCE TO RELATED PATENT APPLICATION

This application is a divisional application of U.S. patent application Ser. No. 09/621,183, filed Jul. 21, 2000, now U.S. Pat. No. 6,538,603.

BACKGROUND OF THE INVENTION

This invention relates to radio frequency antennas, and more particularly to phased array antennas.

Microwave terrestrial and satellite communications systems are rapidly being deployed to serve communications needs. In these systems, to ensure a radio communication link between a fixed station on the ground or on a satellite and a mobile station such as an automobile or airplane, antenna systems with scanning beams have been put into practical use. A scanning beam antenna is one that can change its beam direction, usually for the purpose of maintaining a radio link, e.g. to a tower or satellite, as a mobile terminal is moving and changing direction. Another application of a scanning beam antenna is in a point-to-multipoint terrestrial link where the beams of a hub antenna or remote antenna must be pointed at different locations on a dynamic basis.

Most of the beam scanning antennas in commercial use today are mechanically controlled. This has a number of disadvantages including: limited beam scanning speed as well as limited lifetime, reliability and maintainability of the mechanical components such as motors and gears.

Electronically controlled antennas are becoming more important with the need for higher speed data, voice and video communications through geosynchronous earth orbit (GEO), medium earth orbit (MEO) and low earth orbit (LEO) satellite communication systems and point-to-point and point-to-multipoint microwave terrestrial communication systems. Additionally, new applications such as automobile radar for collision avoidance can make use of antennas with electronically controlled beam directions.

Phased array antennas are well known to provide such electronically scanned beams and could be an attractive alternative to mechanically tracking antennas because they have the features of high beam scanning (tracking) speed and low physical profile. Furthermore, phased array antennas can provide multiple beams so that multiple signals of interest can be tracked simultaneously, with no antenna movement.

Array antennas work by well-understood principles. In typical embodiments, they incorporate electronic phase shifters that provide a differential delay or phase shift to adjacent radiating elements to tilt the radiated phase front and thereby produce far-field beams in different directions depending on the differential phase shifts applied to the individual elements or, in some cases, groups of elements (sub-arrays). The typical circuit topologies (circuit diagrams) of array antennas are well known to those skilled in the art.

However, the presently used phased array antennas are too expensive for most commercial applications. Their use has been generally limited to relatively small quantities of specialized and expensive systems such as military, aircraft, and space systems. Typically, phased arrays employ hundreds or thousands of radiating elements and a correspondingly high number of phase shift elements. Their cost is proportional to the number of elements and the number of active electronic devices such as amplifiers and phase shifters.

Furthermore, conventional state-of-the-art phase shifters such as MEMS, MMIC, PIN diodes, or Ferrite devices, have high insertion loss, which at high frequencies, generally requires the use of amplifiers at the array elements. Such active arrays are very expensive and their use is limited to small volume, high performance applications where cost is not the primary driver.

Tunable ferroelectric materials are the materials whose permittivity (more commonly called dielectric constant) can be varied by varying the strength of an electric field to which the materials are subjected or immersed. Even though these materials work in their paraelectric phase above the Curie temperature, they are conveniently called "ferroelectric" because they exhibit spontaneous polarization at temperatures below the Curie temperature. Typical tunable ferroelectric materials are barium-strontium titanate (BST) or BST composites.

Dielectric materials including barium strontium titanate are disclosed in U.S. Pat. No. 5,312,790 to Sengupta, et al. entitled "Ceramic Ferroelectric Material"; U.S. Pat. No. 5,427,988 to Sengupta, et al. entitled "Ceramic Ferroelectric Composite Material-BSTO—MgO"; U.S. Pat. No. 5,486,491 to Sengupta, et al. entitled "Ceramic ferroelectric composite material—BSTO—$ZrO_2$"; U.S. Pat. No. 5,635,434 to Sengupta, et al. entitled "Ceramic Ferroelectric Composite Material-BSTO-Magnesium Based Compound"; U.S. Pat. No. 5,830,591 to Sengupta, et al. entitled "Multilayered Ferroelectric Composite Waveguides"; U.S. Pat. No. 5,846,893 to Sengupta, et al. entitled "Thin Film Ferroelectric Composites and Method of Making"; U.S. Pat. No. 5,766,697 to Sengupta, et al. entitled "Method of Making Thin Film Composites"; U.S. Pat. No. 5,693,429 to Sengupta, et al. entitled "Electronically Graded Multilayer Ferroelectric Composites"; and U.S. Pat. No. 5,635,433 to Sengupta, entitled "Ceramic Ferroelectric Composite Material-BSTO—ZnO". These patents are hereby incorporated by reference. A copending, commonly assigned United States patent application titled "Electronically Tunable Ceramic Materials Including Tunable Dielectric And Metal Silicate Phases", by Sengupta, filed Jun. 15, 2000, discloses additional tunable dielectric materials and is also incorporated by reference. The materials shown in these patents, especially BSTO—MgO composites, show low dielectric loss and high tunability. Tunability is defined as the fractional change in the dielectric constant with applied voltage. These unique properties make these materials suitable for microwave applications such as phase shifter, tunable filters, tunable resonators, and delay lines.

U.S. Pat. No. 5,617,103 discloses a ferroelectric phase shifting antenna array that utilizes ferroelectric phase shifting components. The antennas disclosed in that patent utilize a structure in which a ferroelectric phase shifter is integrated on a single substrate with plural patch antennas. The structure disclosed in this patent may not permit the close spacing between radiating elements required in antennas that operate with high frequencies. Additional examples of phased array antennas that employ electronic phase shifters can be found in U.S. Pat. Nos. 5,079,557; 5,218,358; 5,557,286; 5,589,845; 5,617,103; 5,917,455; and 5,940,030.

One known type of phase shifter is the microstrip line phase shifter. Examples of microstrip line phase shifters utilizing tunable dielectric materials are shown in U.S. Pat.

Nos. 5,212,463; 5,451,567 and 5,479,139. These patents disclose microstrip lines loaded with a voltage tunable ferroelectric material to change the velocity of propagation of the guided electromagnetic wave.

While generally the beam scanning antennas must be able to move their beams in arbitrary directions over some angular range known as the field of view or field of regard, there are many applications where the simplification of a one-dimensional beam movement or scanning is desirable.

What is needed for competitive satellite and/or terrestrial systems, whether for satellite communications, commercial radar applications (such as for cars), or for terrestrial communications applications is a phased array antenna that has the features of electronic beam scanning yet is relatively inexpensive. An array that can achieve electronic beam scanning by using low cost, low insertion loss phase shifters would fulfill a need that cannot be satisfied with conventional phase shifters. Such an antenna is the subject of this invention.

BRIEF SUMMARY OF THE INVENTION

This invention provides a phased array antenna comprising an input, a feed network electronically coupled to the input, a plurality of radiating elements, a plurality of continuously voltage tunable phase shifters for receiving signals from the feed network and providing phase shifts for the signals prior to transmitting the signals to the radiating elements, and a controller for controlling the phase shift provided by the phase shifters.

This invention encompasses phased array antennas which produce beams that can be scanned in one dimension (one-dimensional) or two dimensions (two-dimensional) by using continuously adjustable phase shifters that are based on low cost, low loss voltage-tunable dielectric materials. Such antennas have many applications including, but not limited to, microwave terrestrial wireless communications, radar, and satellite communications.

DESCRIPTION OF THE PREFERRED EMBODIMENTS

In the descriptions to follow, the features of the antenna apply whether it is used for transmitting or receiving. For a passive reciprocal antenna, it is well known that the properties are the same for both the receive or transmit modes. Therefore, no confusion should result from a description that is made in terms of one or the other mode of operation and it is well understood by those skilled in the art that the invention is not limited to one or the other mode.

Figure 1:
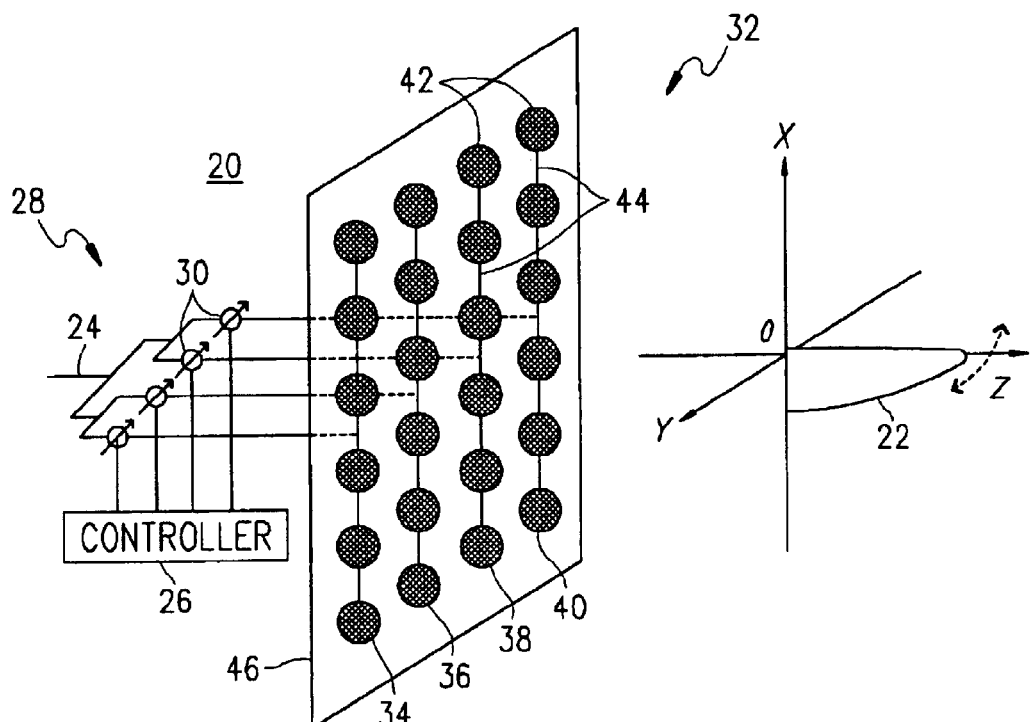
FIG. 1 is a schematic representation of a one-dimensional scan phased array antenna according to the present invention, and its radiation pattern.

Referring to the drawings, FIG. 1 is a schematic representation of a one-dimensional scan phased array antenna 20 according to the present invention, and its radiation pattern 22. This antenna scans a radiating beam in a horizontal direction by electronically changing the phase of the electromagnetic energy supplied to the individual radiation sub-arrays.

The one-dimensional scan phased array antenna includes RF signal input port 24, controller 26, feeding system 28, phase control means including a plurality of phase shifters 30, and radiation element array 32. The radiation element array includes a plurality of subarrays 34, 36, 38 and 40. Each sub-array includes a plurality of radiating elements 42 that are connected by feed lines 44 and mounted on a grounded low loss dielectric substrate 46.

For each sub-array in the radiation element array 32, the phase can be controlled to get a desired radiation direction in the plane vertical to the sub-array, i.e. the y-z plane. In FIG. 1 the radiation direction is changeable in y-z plane. The radiation pattern 22 can change its beam direction electronically in the y-z plane with a fixed designed pattern in the x-z plane, for example, cosecant-square and pencil beam patterns.

Figure 2:
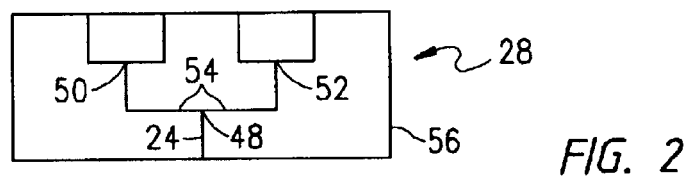
FIG. 2 a schematic representation of the feeding system of the antenna in FIG. 1.

FIG. 2 a schematic representation of the feeding system that is used in the one-dimensional scan phased array antenna shown in FIG. 1. A radio frequency (RF) signal is fed to the input port 24 of the one-dimensional scan phased array antenna. The signal power is distributed into several parts by dividers 48, 50 and 52. The dividers can also be referred to as combiners or splitters depending on whether the antenna is viewed as a receiving antenna or a transmitting antenna. The multiple signals passing through the divider on transmission lines 54 are fed to multiple sub-array elements. Such transmission lines can take many known forms such as waveguides or, as shown here, microstrip lines (co-planar lines or strip lines). The divider (combiner or splitter) along with microstrip lines (co-planar lines or strip lines) is preferably etched on low loss dielectric substrate 56. The power of RF signals can be divided into equal or unequal amounts and delivered to the phase shifters for a desired radiation pattern in the scan plane. Every port of feeding system 28 in FIG. 2 should have a good RF impedance match with the phase shifters in the phase control system. While FIG. 2 shows a preferred feeding system, other well understood feeding methods could be used and are described in the aforementioned references.

Figure 3:
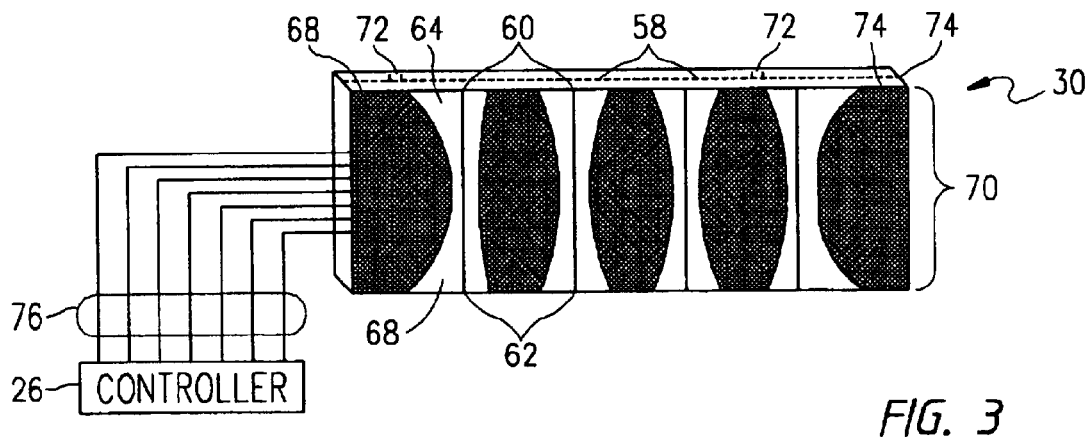
FIG. 3 a schematic representation of the phase control means of the antenna in FIG. 1.

FIG. 3 a schematic representation of the phase control means shown in FIG. 1. The phase control means 30 in FIG. 3 includes four microstrip line phase shifters 58, each having two ports 60 and 62, one of which is an input and the other of which is an output depending upon whether the antenna is operating in the transmit or receive mode. Matching 64 and 66 are provided at each port. The microstrip lines are mounted on a composite substrate 68 containing a voltage tunable dielectric layer 70. Biasing electrodes 72 are provided on the composite substrate to apply a control voltage to the tunable dielectric material. A ground plane 74 is also included. The controller 26 controls the bias voltage applied to the tunable dielectric material through control lines 76 to control the phase shift of a signal passing through the phase shifters.

The microstrip lines can be replaced by various types of transmission lines, such as co-planar lines, strip lines, fin-line or other RF transmission lines. As discussed in more detail below, these microstrip lines are directly supported by the voltage-tunable dielectric layer, which in turn is supported by a low loss conventional nontunable dielectric layer or the same tunable dielectric layer. The micro-controller 26 controls the phase shifters through control lines 76 to continuously provide a phase shift ranging from 0 degree to 360 degree for every phase shifter. The divided separate multiple RF signals are controlled to have a prescribed amplitude and phase before being fed to each sub-array of the radiation elements. Input and output ports of each phase shifter in 30 should have a good RF match with feeding system 28 and the radiation elements in the associated sub-array of radiation elements 42.

Figure 4:
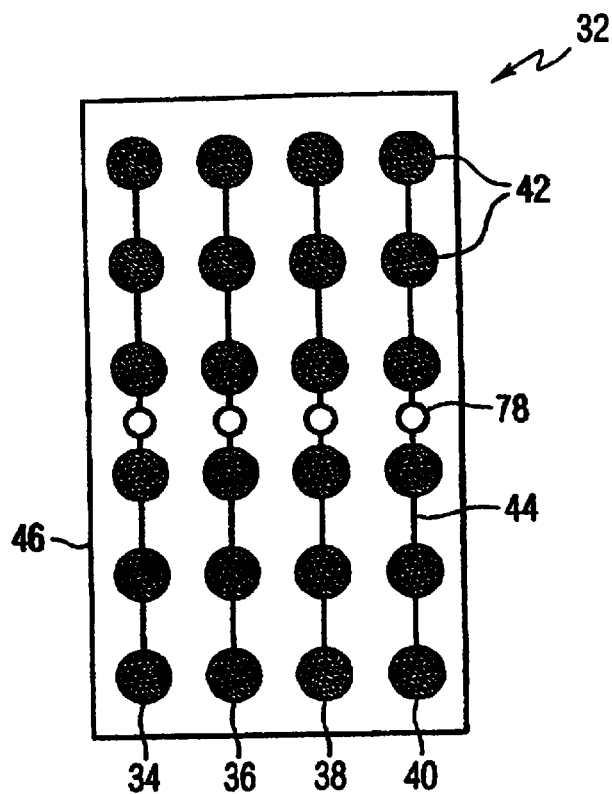
FIG. 4 a schematic representation of the radiation element array shown in FIG. 1.

FIG. 4 a schematic representation of the radiation element array shown in FIG. 1. There are four sub-arrays 34, 36, 38 and 40, in FIG. 4. Every sub-array is fed through a sub-array input port 78. Each column of the sub-array can have any number of radiation elements 42 that are connected through feeding lines 44. The sub-arrays can be designed for different purposes, such as to provide a fixed radiation pattern in the vertical plane, i.e. x-z plane. The radiation elements 42 in FIG. 4 are illustrated as micro strip patches. The feeding lines 44 shown in FIG. 4 are microstrip lines. Both radiation elements 42 and feed lines 44 are etched on a grounded low loss dielectric substrate 46.

It should be understood that the present invention is not limited to the exact structure shown in the drawings. For example, other well known radiating elements such as printed dipole elements, slot elements, waveguide elements, helical elements, and other types of feed lines such as co-planar lines, strip lines, fin-lines, etc. also can be used.

The number of sub-arrays in radiation element array 32 is the same as the number of phase shifters in phase control system 30. The distance between two adjacent sub-arrays should be in the range of 0.5 to 1 of the working wavelength of the signals to be transmitted and/or received by the antenna for the purpose of getting high gain without grating lobes. The criteria for choosing the element spacing are well known. To achieve the desired spacing of the radiating elements, the phase shifting elements of the antennas of this invention are not located in the plane occupied by the radiating elements. Every input port 78 of sub-array in radiation element array 32 should have a good RF impedance match with every phase shifter through RF lines, such as micro strip lines, cables, strip lines, fin-lines, co-planar lines, waveguide lines, etc.

By electronically adjusting the phase and amplitude of the feeding power that is fed to every sub-array through input port 78, the tunable radiation patterns can be obtained in y-z plane (horizontal) like the one shown in FIG. 1.

The one-dimensional scan phased array antenna that is described above has a radiation pattern with a fixed beam shape and width in one plane (for example, the vertical plane) and scanning radiation beam in other plane (for example, the horizontal plane). This one-dimensional scan phased array antenna can be applied to microwave terrestrial wireless communications and satellite communications systems.

Figure 5:
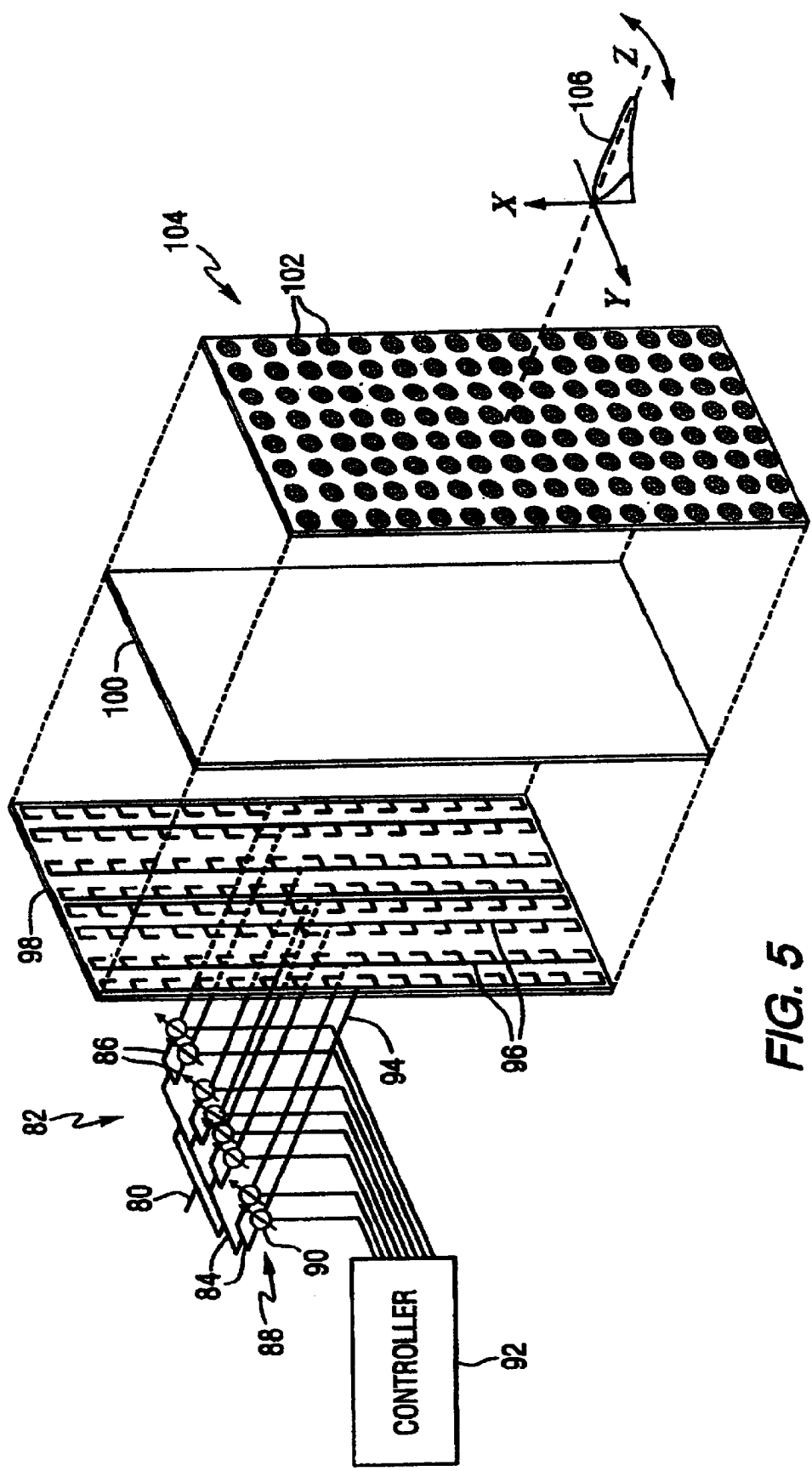
FIG. 5 is a schematic representation of a one-dimensional scan phased array antenna according to an embodiment of the present invention, and its radiation pattern.

FIG. 5 is a schematic representation of an exploded view of a one-dimensional scan phased array antenna according to another embodiment of the present invention, and its radiation pattern. In the embodiment of FIG. 5, an RF signal is applied to input 80 and split by a network 82 of dividers 84 to produce a plurality of signals on transmission lines 86. The power divider can be one of many acceptable types with microstrip lines, co-planar lines, waveguide lines, slot lines, strip lines and cables, which divides RF power into multiple outputs to supply the phase shifters with low loss.

A phase shifting network 88 includes a plurality of phase shifters 90 that receive the signals on the transmission lines. A controller 92, in the form of a personal computer, applies a bias voltage to the phase shifters to produce phase-shifted signals on lines 94. The amount of phase shift for every phase shifter will be calculated and controlled by the controller. Lines 94 are connected to a plurality of feed lines 96 in a feed line assembly 98. A slot matrix 100 is positioned adjacent to the feed line assembly to transfer the signals from the various elements in the feed line assembly to the radiating elements 102 in the radiating element array 104, thereby producing radiation pattern 106. By varying the phase of the signals supplied to the radiating elements, the radiation pattern can be scanned in the horizontal direction.

In the radiation element array of FIG. 5, eight columns of sub-arrays are excited from eight phase shifters. For each sub-array, microstrip feed lines through slots in the slot matrix, which are etched on a grounded substrate, feed 16 radiation elements. The example radiation elements are circular microstrip patches, although other types of radiating elements may be used. These radiation elements radiate a vertical linearly polarized radiation pattern in x-z plane in a cosecant square beam shape, while the radiation direction in y-z plane can change from −90 degrees to +90 degrees by electronically phase shifting the divided components of the input signal.

Figure 6:
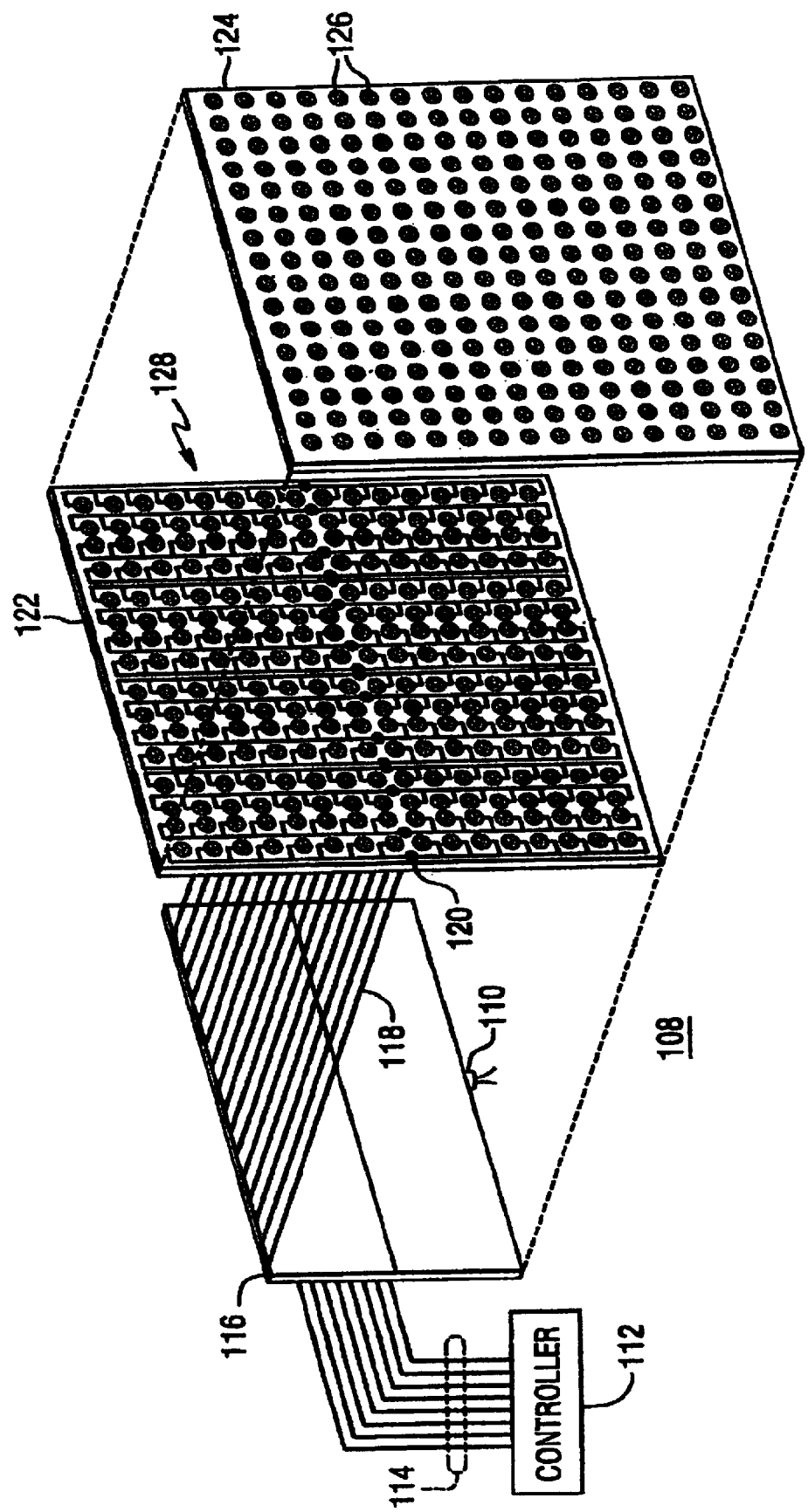
FIG. 6 is a schematic representation of a one-dimensional scan phased array antenna according to another embodiment of the present invention.

FIG. 6 is another simplified schematic representation of a two-dimensional scan phased array antenna 108 according to another embodiment of the present invention. An RF signal is applied to the input 110. A divider (not shown) divides the input signal into various components that are delivered to a plurality of phase shifters. The divider can be a microstrip line type that directly connects to co-planar line tunable phase shifters. A controller 112 provides bias voltages on lines 114 to a network of ferroelectric phase shifters 116 to control the phase of the signals on lines 118. The co-planar line tunable phase shifters are connected to the sub-array radiation elements. The connection could be via hole, slot coupling, aperture coupling or other means. In the illustrated embodiment, lines 118 are connected to ports 120 in a feed line assembly 122 to produce signals that are coupled to an array 124 of radiating elements 126. In this case, the phase shifts are applied to adjacent elements in such a manner as to cause the phase front of the output signal emanating from the radiating elements to tilt in an arbitrary direction relative to the array face. This can be envisioned by separating the tilt control so that the radiating elements along one direction in the array cause a phase front to tilt on one plane while, at the same time, phase control to elements in an orthogonal direction in the array are controlled to produce a phase front tilt in an orthogonal plane. As with the one-dimensional antennas, the invention includes a unique phase control assembly and application of the control voltages to the phase shifters.

There are two layers of radiation elements in the radiation element array. The upper layer is the radiation element patch array 124, while the lower layer is a patch array 128 on the feed line assembly 122. The patches in two layers are circular microstrip patches that can radiate a vertical linearly polarized wave with wide bandwidth. Any type of microstrip patch that radiates linearly polarized and/or circularly polarized waves can be used in this invention.

Figure 7:
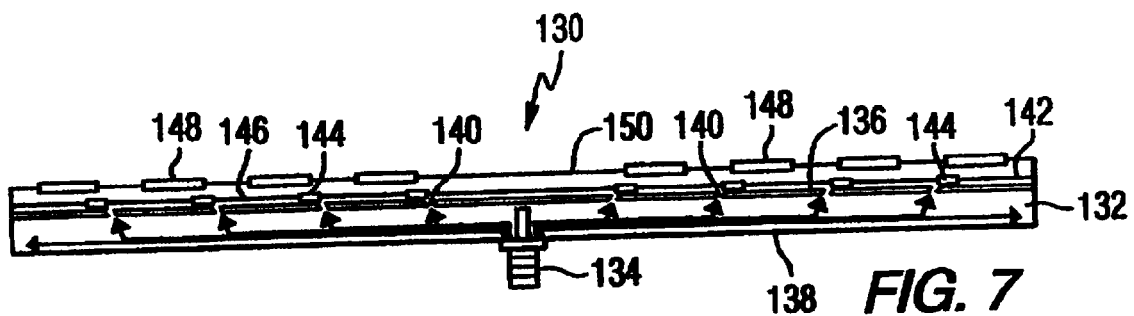
FIG. 7 is a schematic representation of a two-dimensional scan phased array antenna according to another embodiment of the present invention.
Figure 8:
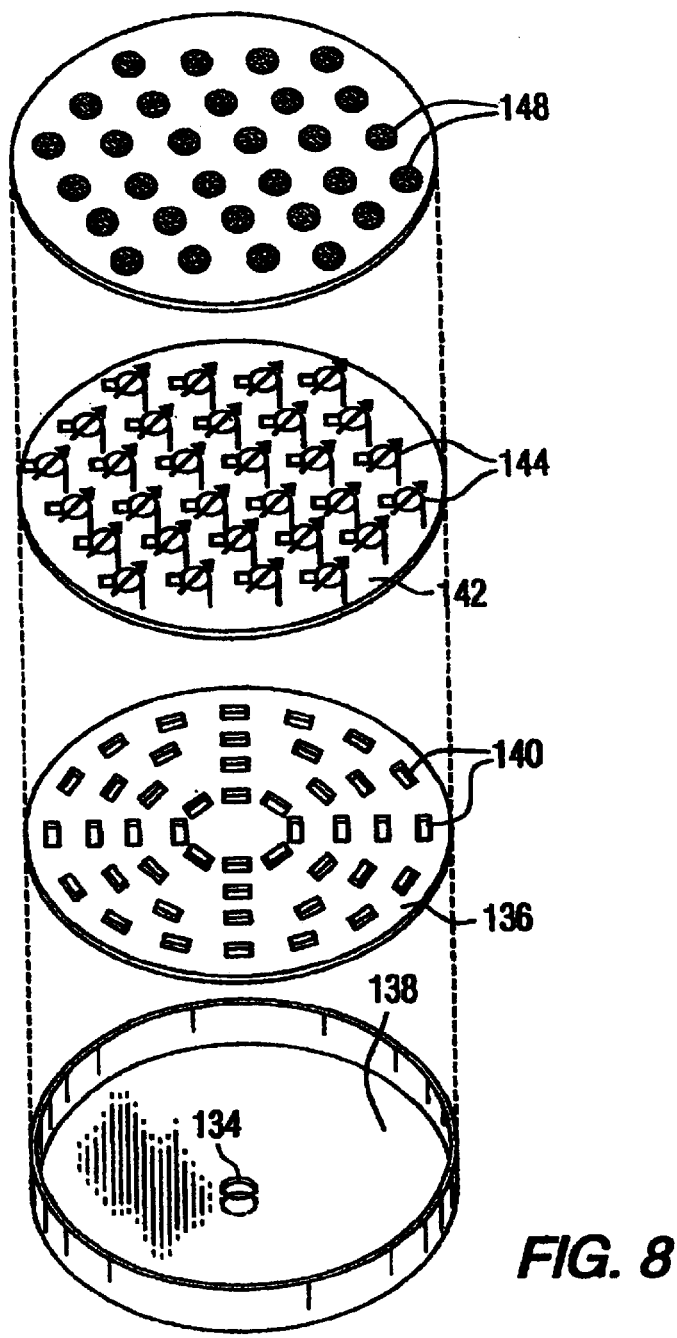
FIG. 8 is an exploded view of the array of FIG. 7.

FIG. 7 is a schematic representation of a two-dimensional scan phased array antenna 130 according to another embodiment of the present invention. FIG. 7 illustrates another example of a phased array that can scan in both angular directions, e.g. azimuth and elevation. FIG. 7 shows a radial waveguide 132 and will be described in the transmit mode, although as noted, the properties for receive mode are identical. Power is fed into the central connector 134 and is distributed by propagation between the parallel plates 136, 138. Plate 138 serves as a ground plane. Slots 140 in the upper plate 138 couple energy to the layer 142 containing the phase shifters 144 and control lines 146. These lines are coupled to the radiating patch elements 148 on the outer surface 150 and the signals applied to these radiators are phased to radiate in a specific direction. The phases necessary to produce a beam in a given direction are known from prior calibration or analysis and may readily be stored in the memory of a suitable control circuit (not shown). FIG. 8 is an exploded view of the antenna of FIG. 7, which shows more clearly the described elements.

Figure 9A:
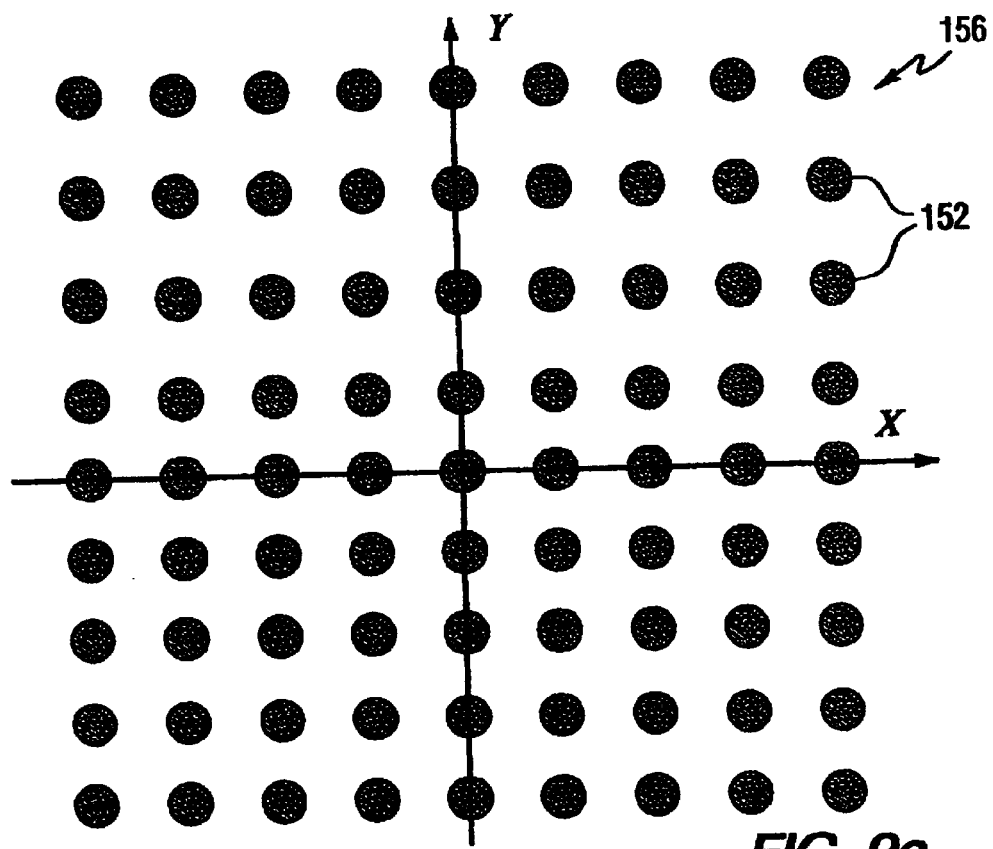
FIGS. 9a and 9b are schematic representations of the radiating element layouts for a planar array.
Figure 9B:
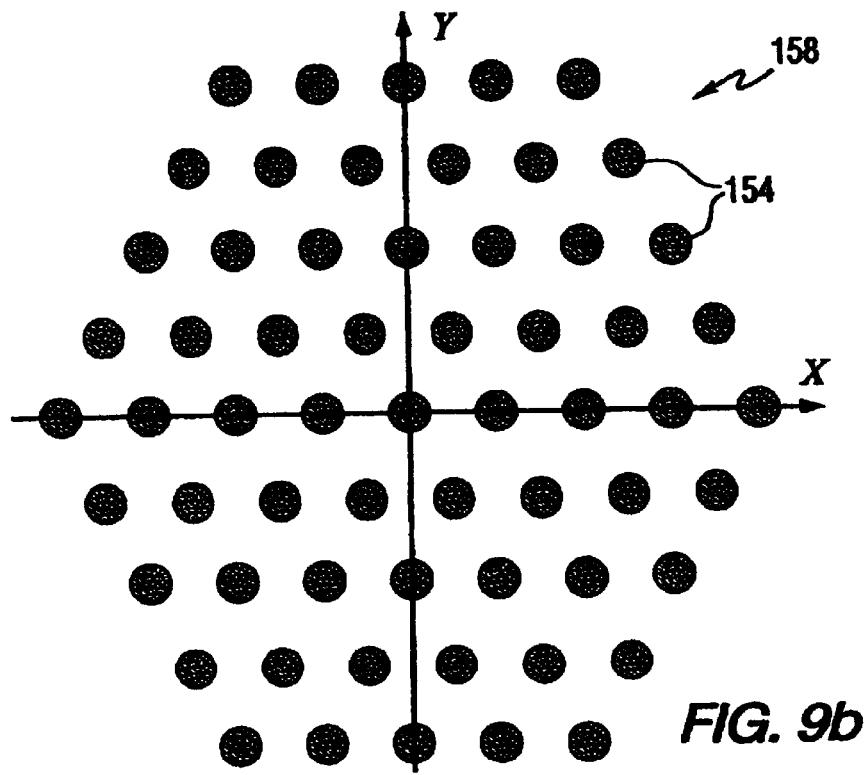

FIGS. 9a and 9b show example layouts of radiating elements 152 and 154 for planar arrays 156 and 158 respectively. It should be readily appreciated that other layouts are possible and the arrays are not constrained to be planar.

Figure 10A:
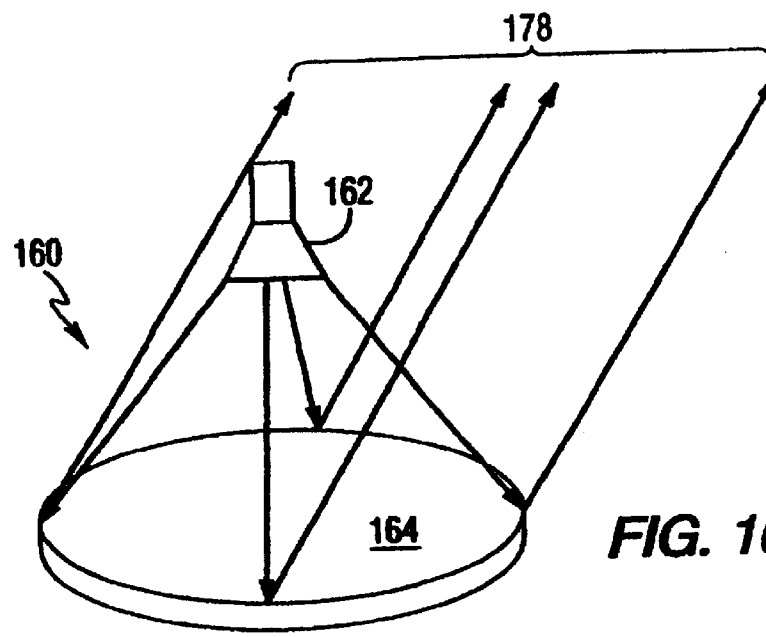
FIGS. 10a, 10b and 10c are schematic representations of a two-dimensional scan phased array antenna according to another embodiment of the present invention.
Figure 10B:
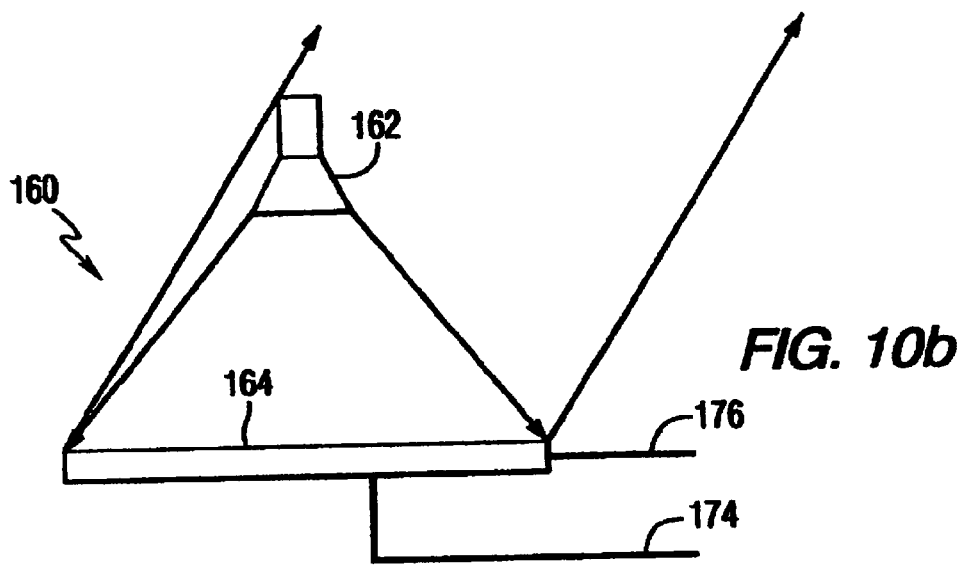
Figure 10C:
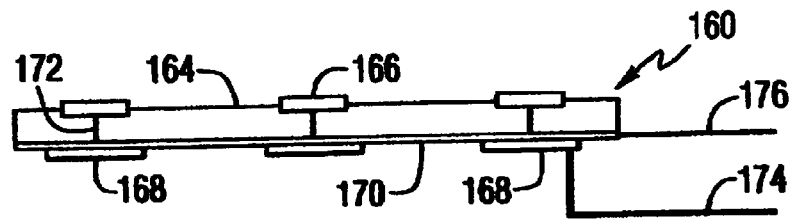

FIGS. 10a, 10b and 10c are schematic representations of a two-dimensional scan phased array antenna 160 constructed according to another preferred embodiment of the present invention. In array antenna 160, the array elements and phase shifters act as reflection devices. A feed antenna 162, such as a horn, or other suitable illuminating antenna, radiates energy toward the array face 164. Each patch element 166 on the array face couples that energy to a reflection phase shifter 168. The patch elements couple to the back layer 170 and the energy enters the phase shifters that are terminated (e.g. in an open or short circuit) so as to reflect the energy back to the coupler 172 and from there to the front surface where it is radiated. By applying the appropriate control voltage on line 174 and 176 to the phase shift elements, the reflected energy from each of the phase shifters can be made to produce a tilted phase front 178 and hence, a scanned beam.

In FIGS. 10a, 10b and 10c, a reflect phased array antenna is shown wherein a feed horn first illuminates the array patch radiators. The patches couple their energy to a second layer containing the transmission lines and reflect type phase shifters. This energy traverses the transmission line, experiences total reflection at, for example, an open circuit, again traverses the transmission line on its way back to the top layer, and is radiated into space by the same top layer patches in a direction determined by the phase shifts from the voltage-controlled phase shifters.

Alternatively, the basic structure of FIGS. 10a, 10b and 10c can be used to construct one-dimensional and two-dimensional scanning antennas wherein the basic topology is that of a lens, Such a structure can be realized if, for example, the reflection layer in FIGS. 10a, 10b and 10c is a transmission layer and the radiated energy passes through the array and phase shifters to radiate out the "bottom" of the device.

Figure 11:
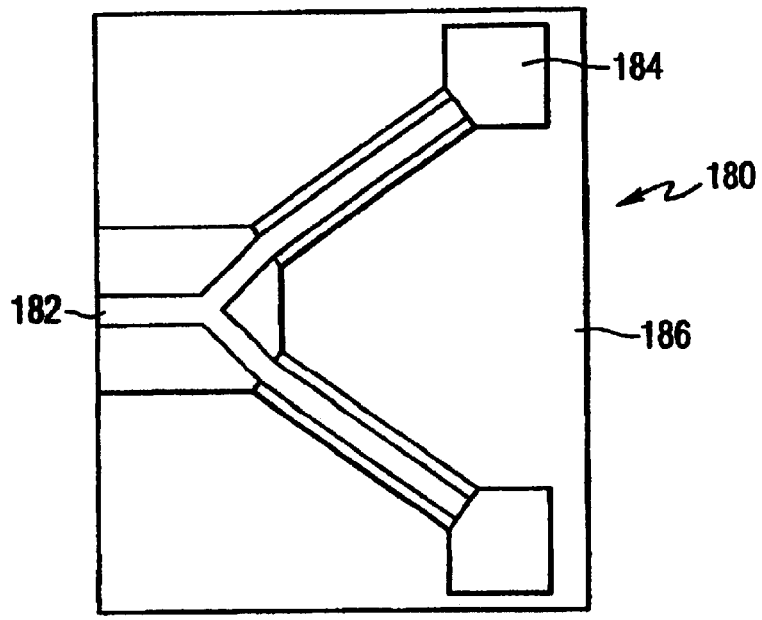
FIG. 11 is an example of a reflect type phase shift element that may be used in the antenna of FIGS. 10a, 10b and 10c.

FIG. 11 illustrates a particular embodiment of a reflect type phase shifter 180 wherein the RF energy traverses a transmission line 182, sees an open circuit, 184 and experiences a phase shift dependent on the voltage-tunable material 186 and its applied DC control voltage.

Figure 12:
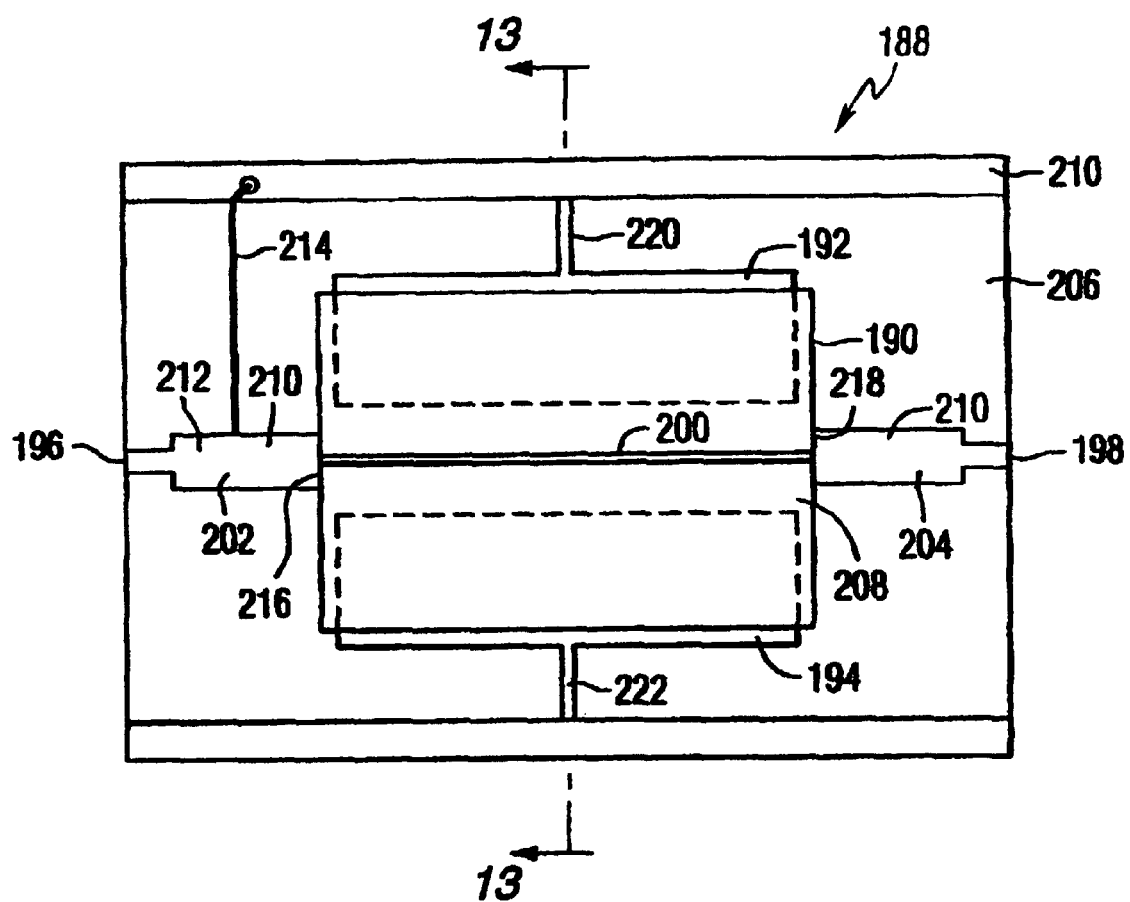
FIG. 12 is a plan view of a preferred embodiment of a phase shifter that can be used in the antennas of the present invention.
Figure 13:
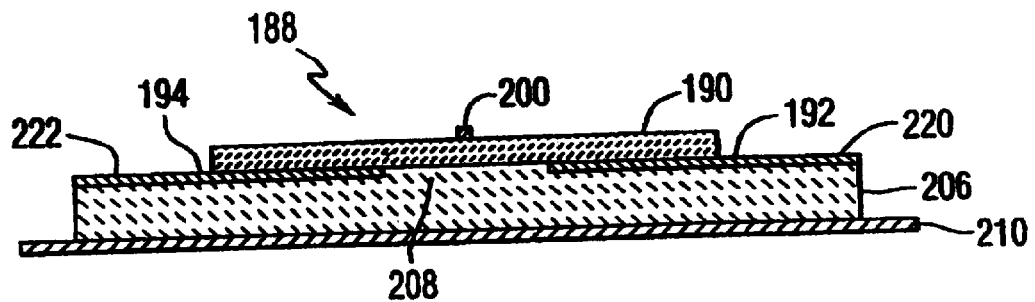
FIG. 13 is a cross-sectional view of the phase shifter of FIG. 12, taken along line 13—13.
Figure 14:
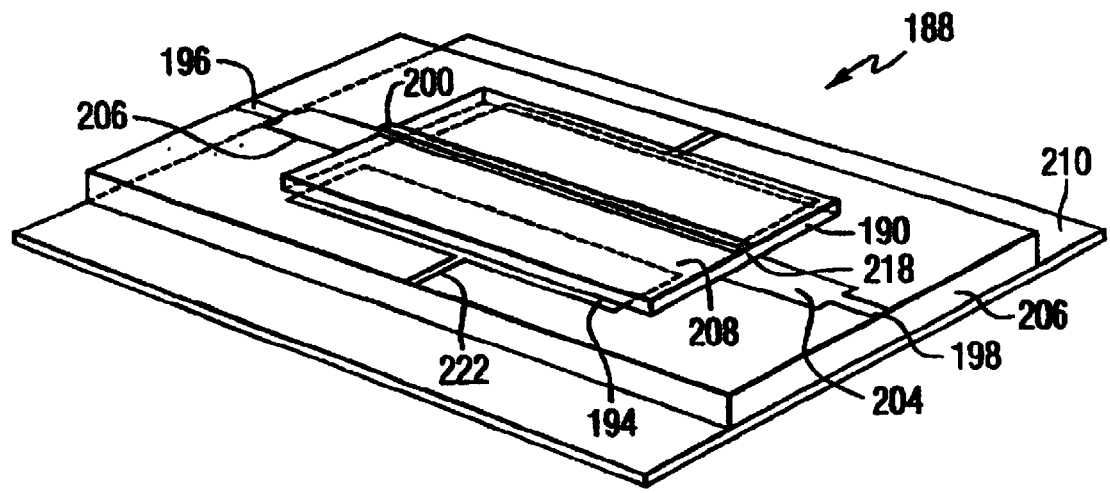
FIG. 14 is an isometric view of the phase shifter of FIG. 12.

FIG. 12 is a top view of a phase shifter 188 that can be used in the antennas of the present invention. FIG. 13 is a cross-sectional view of the phase shifter of FIG. 12, taken along line 13—13, and FIG. 14 is an isometric view of the phase shifter of FIG. 12. The phase shifter operates on the principle of using a voltage tunable dielectric layer 190 as part of a composite dielectric supporting the microstrip. The particular arrangement of biasing electrodes 192 and 194 eliminates the need for high voltage DC blocking circuits. The phase shifter can be used over a wide frequency range, from 500 MHz to 40 GHz.

The phase shifter is a two port device, with ports 196 and 198 for input and/or output of a guided electromagnetic wave. It includes a microstrip line 200, matching networks 202 and 204 at each port, a composite substrate 206 supporting the voltage tunable dielectric layer 190. The voltage tunable layer in the phase shifters used in this invention can be comprised of the dielectirc materials disclosed in the previously mentioned patents and copending patent application that have been incorporated by reference.

The microstrip line 200, a conducting strip preferably made of copper, is directly supported by the first dielectric layer 190, which is the voltage tunable layer. The first dielectric layer 190 itself is in turn supported by a second dielectric layer 206, which could be either a low loss, conventional non-tunable dielectric layer, or it could be of the same material as the first dielectric layer. The biasing electrodes 192 and 194 are inserted between the first and second dielectric layers, on each side of the microstrip so as to leave a slot 208 wider than the microstrip line itself directly under the microstrip line. The second dielectric is supported by a first conducting ground plane 210, preferably made from a high conductivity conductor such as copper.

The matching networks 202 and 204, which could be in the form of matching quarter wave transformers or microstrip circuits, are supported by a third conventional non-tunable dielectric layer 210, which is supported by a second ground plane 212 that is electrically connected to the first ground plane. The third dielectric layer should preferably be of the same material as the second dielectric layer, and could therefore form one continuous layer material. The first and second ground planes should preferably also form one continuous ground plane.

The matching networks are electrically connected to the microstrip line. If the microstrip line is not DC connected to the ground plane via a DC electric path outside the physical domain of the phase shifter, such as via a microstrip to waveguide adapter, then one of the matching networks should also contain DC connection 214 with an RF block to the ground. The latter could be in the form of a short-circuited quarter wavelength stub, or a highly inductive wire (RF choke) connecting the circuit to the ground plane.

The matching networks are to ensure that a guided electromagnetic wave entering one port (defined as the input port) will enter the phase shifter and leave at the other port (output), with minimum residual reflections at each port. The microstrip and ground plane are kept at zero voltage, while the voltage bias is applied to the electrodes. The voltage bias causes a DC electric field in the voltage tunable dielectric, which affects the dielectric permittivity of the medium. In this way, the dielectric permittivity of the voltage tunable dielectric can be controlled by the voltage bias. Since the velocity of the guided wave is inversely proportional to the square root of the effective dielectric permittivity of the medium around the strip, the biasing voltage can be used to control the guided wave velocity. Therefore, it also controls the amount of phase delay at the output port when referenced to the input port.

Since particular embodiments of the phase shifters would be designed for certain frequency ranges, in the following description, all references to wavelength will be considered to apply to the center frequency of the design.

The matching networks are in the form of microstrip quarter wave transformers 202, 204 supported by the second dielectric layer. The matching networks are electrically connected to the microstrip line via metal steps 216 and 218 at the ends of the first dielectric layer. An RF block circuit 214 is used to provide a DC electric path between the microstrip line and the ground. This can be achieved by connecting the matching quarter wave transformer to the ground plane via a quarter wavelength long short-circuited stub that has a very high characteristic wave impedance. The biasing voltage is supplied via DC feed lines 220 and 222 to biasing electrodes 192 and 194 respectively.

The advantage of this embodiment of the phase shifter is that it is essentially a wide band device. The bandwidth is only limited by the matching networks, which were depicted for the sake of simplicity as single stage matching transformers. With multistage matching networks, an arbitrary bandwidth up to an octave of more can be achieved. The disadvantage of this embodiment is that a comparatively long length of microstrip is needed for a certain amount of phase shift tuning range. This is because of the fact that the microstrip line couples to the ground plane via a composite dielectric, with only one of the layers in the composite being tuned.

Figure 15:
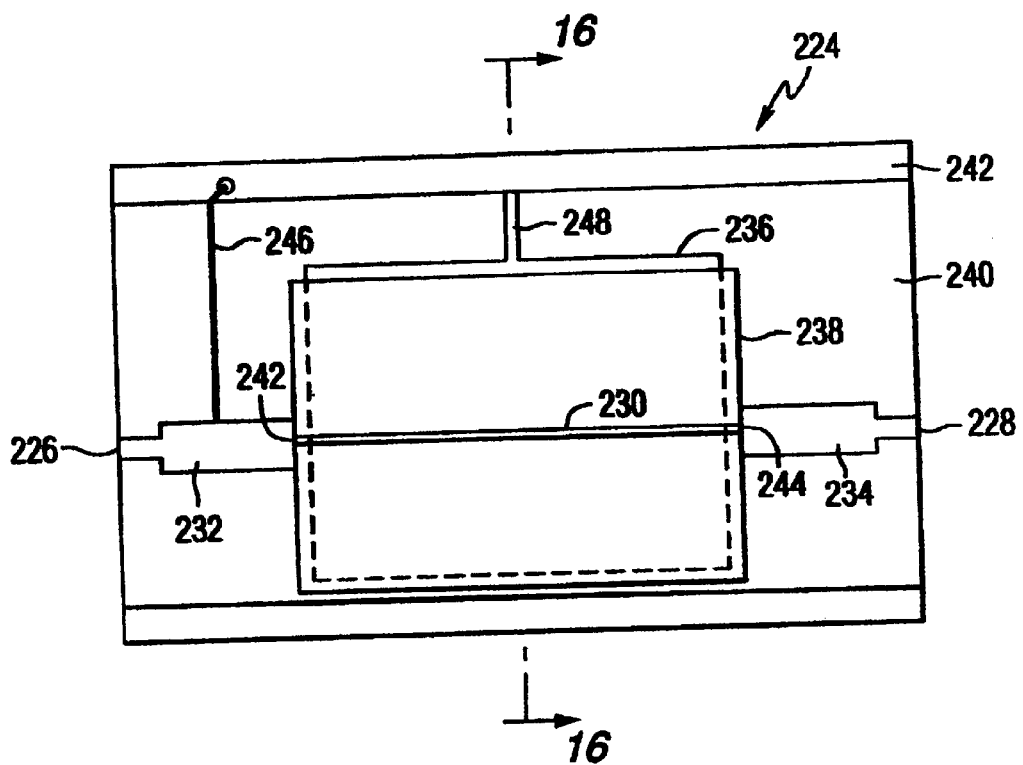
FIG. 15 is a plan view of a second embodiment of a microstrip phase shifter that can be used in the antennas of the present invention.
Figure 16:
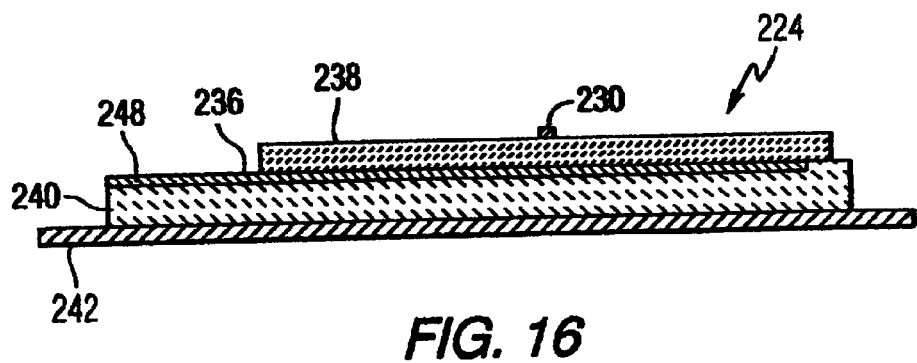
FIG. 16 is a cross-sectional view of the phase shifter of FIG. 15, taken along line 16—16.

FIG. 15 is a plan view of another embodiment of a microstrip phase shifter that can be used in the antennas of the present invention; and FIG. 16 is a cross-sectional view of the phase shifter of FIG. 15, taken along line 16—16. In the phase shifter of FIGS. 15 and 16, the biasing electrode forms a second ground plane for the microstrip line.

The phase shifter of FIGS. 15 and 16 has two ports 226 and 228, for input and/or output of the electromagnetic guided wave. It includes a microstrip line 230, matching quarter wave transformers 232, 234, biasing electrode/ microstrip ground plane 236, and a composite dielectric substrate containing a voltage tunable dielectric layer 238 and a nontunable dielectric layer 240. The first dielectric layer is in turn supported by the biasing electrode 236 and the second dielectric layer, which is preferably a low loss, conventional non-tunable dielectric layer, for example a ceramic such as aluminum oxide or magnesium oxide or another low loss material. The biasing electrode is therefore situated between the first and second dielectric layers, forming a "floating" ground plane for the microstrip line. The second dielectric is supported by a ground plane 242, preferably made from a high conductivity conductor such as copper. To avoid resonance modes in the floating ground plane/biasing electrode, it should be an odd multiple of quarter wavelengths long in terms of the waves trapped between it and ground plane.

The matching networks are in the form of a microstrip quarter wave transformers 232, 234 supported by the second dielectric layer 240. The matching networks are electrically connected to the microstrip via metal steps 242 and 244 at the ends of the first dielectric layer 238. An RF block circuit 246 is used to provide a DC electric path between the microstrip line and ground 242. This is achieved by connecting the matching quarter wave transformer 232 to the ground plane 242 via a quarter wavelength short-circuited stub 246 that has a very high characteristic wave impedance.

The biasing voltage is supplied via DC feed line 248 to biasing electrode 236. This embodiment is a narrow band device. The bandwidth is limited to an arbitrary range below or between two of the resonance mode frequencies of the floating ground plane 236. This embodiment has a comparatively short length of microstrip line for a certain required amount of phase shift tuning range. This is because of the fact that the microstrip couples to the floating ground plane 236 only via the single tunable dielectric layer 238. This construction eliminates the need for high voltage DC block circuits to prevent the biasing voltage from causing damage to sensitive RF circuits connected to the phase shifter.

It should be appreciated that certain changes could be made without altering the conceptual design significantly. For example, to avoid the metal steps between the microstrip line and the matching circuits in each embodiment, the first dielectric layer supporting the microstrip line can be sunk into the second dielectric layer, so as to ensure that the microstrip line is coplanar with the matching circuits.

The one-dimensional and two-dimensional scanning phased array antenna embodiments described above could be used as sectors of a hub antenna in point-to-multipoint wireless or satellite communications systems. Also, as mentioned, they are applicable to a wide variety of communications and radar applications. They could also be used in terminals for reception and transmission of signals to communications satellites.

The invention described here is based on high frequency technology, using low loss voltage tunable dielectric material for continuously adjustable phase shifters. Their phase shifts can be adjusted over a broad range such as 0 degrees (0°) to 360 degrees (360°) by simply controlling an applied DC voltage. Only one phase shifter is necessary for each radiation element. By applying phase shifts to elements beam scanning on one or two angular spatial dimensions can be achieved at relatively low loss and low cost compared with conventional phased array antennas using digital phase shifters and many control lines for full two-dimensional beam scanning.

The one-dimensional scan phased array antenna can provide a shaped beam such as a cosecant square beam for the service area in the vertical plane. This beam shape is known to provide a constant receiving power for terminals having different distances from the hub station. It can also provide high gain narrow beam pattern in a horizontal plane for the wide service area, with a changeable radiation direction. The one-dimensional scan phased array antenna is especially useful for point-to-point and point-to-multipoint TDMA systems.

A phased array antenna with low loss voltage-controlled phase shifters that can provide dynamic beam steering for a terrestrial point-to-multipoint system, e.g. by changing the beam direction for each burst in a TDMA system. Antennas constructed in accordance with this invention can provide a fixed or variable amplitude and phase distribution for every radiating element to produce an output beam having linear polarization, right-hand circular polarization, or left-hand circular polarization characteristics.

The two-dimensional scanning antennas are applicable to satellite communications, particularly where the terminals must track satellites in orbit or, even in the case of geostationary satellites, when it is necessary to communicate with more than one satellite at different orbital locations. Such beam steering without requiring mechanical motion is very attractive for small communications terminals at, for example, residential rooftops or small-business sites.

While the invention has been described in terms of what are at present its preferred embodiments, it will be apparent tot those skilled in the art that various changes can be made to the preferred embodiments without departing from the scope of the invention as set forth in the following claims.

What is claimed is:

1. A phased array antenna comprising:
   an input;
   a feed network electrically coupled to the input;
   a plurality of radiating elements;
   a plurality of voltage tunable phase shifters for receiving signals from the feed network and providing phase shifts for the signals prior to transmitting the signals to the radiating elements, wherein each phase shifter includes:
      a microstrip line mounted on a composite substrate having a tunable dielectric layer;
      first and second ports respectively adjacent to first and second ends of the microstrip line;
      first and second matching elements respectively positioned at the first and second ports; and
      biasing electrodes for applying control voltage to the tunable dielectric layer, the biasing electrodes forming a gap extending parallel to the microstrip line on a first side of the tunable dielectric layer opposite the microstrip line; and
   a controller for controlling the phase shift provided by the phase shifters.

2. The phased array antenna of claim 1, wherein the radiating elements are mounted in a first plane and the phase shifters are positioned outside of the first plane.

3. The phased array antenna of claim 1, wherein the feed network comprises a plurality of dividers/combiners for distribution of the signals, said dividers/combiners being fabricated on a dielectric substrate layer.

4. The phased array antenna of claim 1, wherein the controller supplies a DC control voltage to each of said phase shifters through control lines.

5. The phased array antenna of claim 1, wherein the radiating elements are spaced from each other by a distance ranging from about 0.5 to about 1.0 wavelength of a signal to be transmitted by the antenna.

6. The phased array antenna of claim 1, wherein said antenna is a one-dimensional scan phased array antenna.

7. The phased array antenna of claim 1, wherein said antenna is a two-dimensional scan phased array antenna.

8. The phased array antenna of claim 1, wherein multiple ones of the phase shifters are mounted on the composite substrate.

9. The phased array antenna of claim 1, wherein the radiating elements are connected to form sub-arrays, and each of the phase shifters is electronically coupled to one of the sub-arrays.

10. The phased array antenna of claim 1, further comprising:
    a feed line assembly electronically coupled to the phase shifters, the feed line assembly including a first plurality of patch elements for coupling the signals to the radiating elements.

11. The phased array antenna of claim 10, wherein the first plurality of patch elements are connected in a plurality of parallel linear arrays, each of the linear arrays electronically coupled to one of the phase shifters.

12. The phased array antenna of claim 1, further comprising:
    a radial waveguide including first and second parallel plates, said input extending through the first plate, and the second plate including a plurality of openings for coupling the signals between the input and the phase shifters.

13. The phased array antenna of claim 12, wherein the first and second plates are substantially circular.

14. The phased array antenna of claim 1, further comprising a plurality of transmission lines coupling the dividers/combiners to the phase shifters.

15. The phased array antenna of claim 14, wherein each of the transmission lines comprises one of a microstrip line, a strip line, a cable, a waveguide line, and a co-planar line.

16. The phased array antenna of claim 1, wherein each of said plurality of radiating elements comprises one of a microstrip patch element, a slot element, a printed dipole element, and a helical element.

17. The phased array antenna of claim 1, wherein each of said phase shifters is connected to one of said radiating elements by one of a micro strip line, a cable, a strip line, a finline, a co-planar line, and a waveguide line.

18. A phased array antenna comprising:
    an input;
    a plurality of radiating elements mounted in a first plane;
    a feed antenna electrically coupled to the input for illuminating the plurality of radiating elements;
    a plurality of continuously voltage tunable reflection type phase shifters mounted in a second plane;
    a plurality of coupling elements for coupling signals between the radiating elements and the phase shifters; and
    a controller for controlling the phase shift provided by the phase shifters, wherein each phase shifter includes:
       a microstrip line mounted on a composite substrate having a tunable dielectric layer;
       first and second ports respectively adjacent to first and second ends of the microstrip line;
       first and second matching elements respectively positioned at the first and second ports; and
       biasing electrodes for applying control voltage to the tunable dielectric layer, the biasing electrodes forming a gap extending parallel to the microstrip line on a first side of the tunable dielectric layer opposite the microstrip line.

19. The phased array antenna of claim 18, wherein each of the phase shifters includes:
    a transmission line mounted on the tunable dielectric layer;
    the transmission line having an input at a first end and an being open circuited at a second end.

20. The phased array antenna of claim 18, wherein each of the phase shifters includes:
    a transmission line mounted on the Unable dielectric layer;
    the transmission line having an input at a first end and first and second arms connected to a second end;
    each of the first and second arms terminating in an open circuit.

* * * * *